Figure 1:
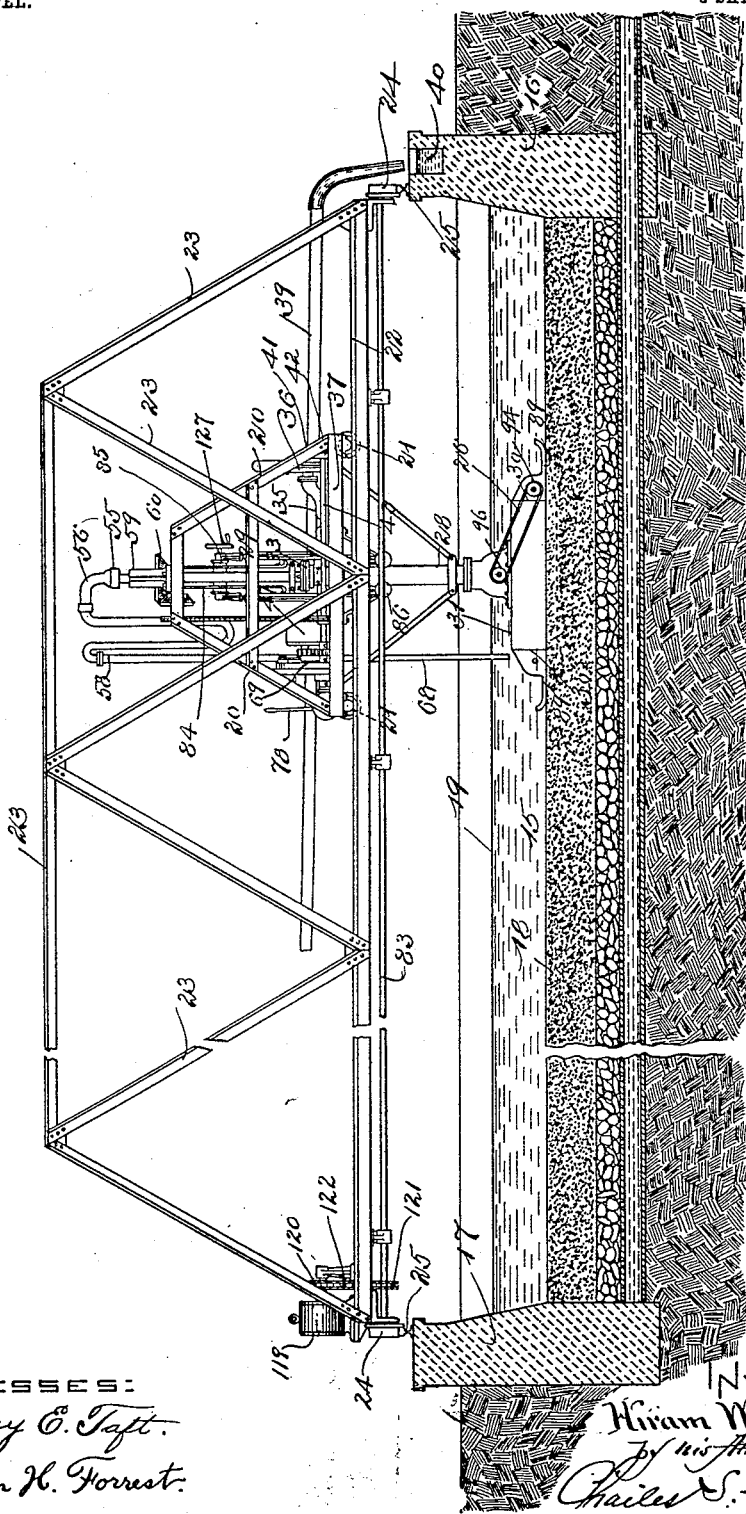

No. 729,718. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 1.

WITNESSES:
Sydney E. Taft.
William H. Forrest.

INVENTOR:
Hiram W. Blaisdell,
by his Attorney,
Charles S. Gooding.

No. 729,718. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 3.

WITNESSES:
Sydney E. Taft.
William H. Forrest.

INVENTOR:
Hiram W. Blaisdell
by his Attorney
Charles S. Gooding.

No. 729,718. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 4.

WITNESSES:
Sydney E. Taft.
William H. Forrest.

INVENTOR:
Hiram W. Blaisdell
by his Attorney,
Charles S. Gooding.

No. 729,718. PATENTED JUNE 2, 1903.
H. W. BLAISDELL.
APPARATUS FOR CLEANING SAND FILTER BEDS.
APPLICATION FILED MAY 3, 1902.

NO MODEL. 6 SHEETS—SHEET 5.

WITNESSES:
Sydney O. Taft.
William K. Forrest.

INVENTOR:
Hiram W. Blaisdell.
by his Attorney
Charles S. Gooding.

No. 729,718. PATENTED JUNE 2, 1903.
H. W. BLAISDELL.
APPARATUS FOR CLEANING SAND FILTER BEDS.
APPLICATION FILED MAY 3, 1902.
NO MODEL. 6 SHEETS—SHEET 6.
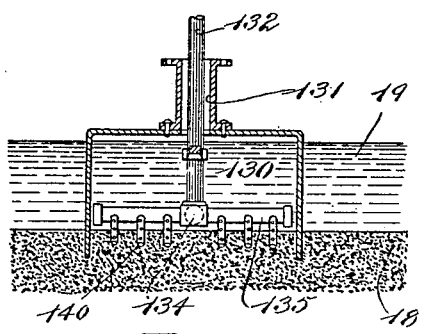
Fig-9-
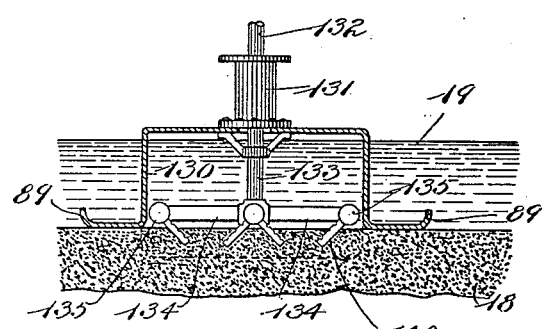
Fig-10-
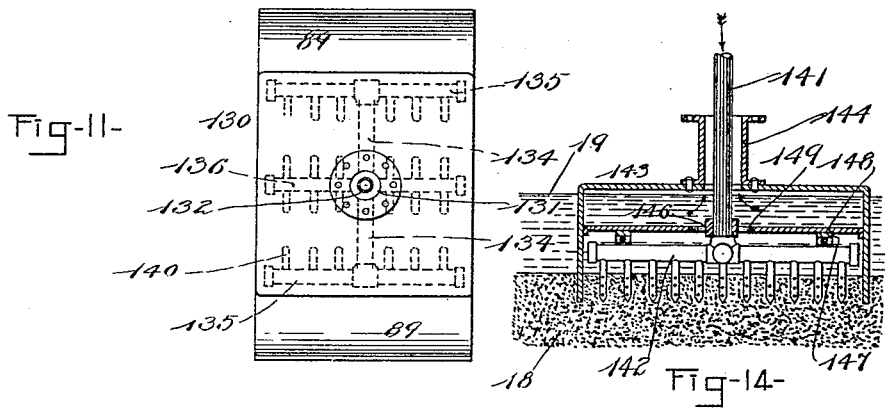
Fig-11-    Fig-14-
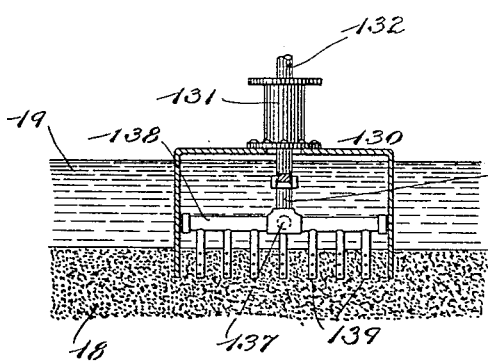
Fig-12-
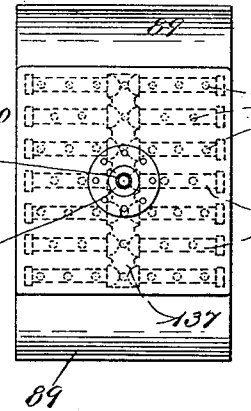
Fig-13-
WITNESSES:
Sydney C. Taft.
William H. Forrest.
INVENTOR:
Hiram W. Blaisdell.
By his Attorney,
Charles S. Gooding.

No. 729,718. Patented June 2, 1903.

UNITED STATES PATENT OFFICE.

HIRAM W. BLAISDELL, OF YUMA, ARIZONA TERRITORY.

APPARATUS FOR CLEANING SAND FILTER-BEDS.

SPECIFICATION forming part of Letters Patent No. 729,718, dated June 2, 1903.

Application filed May 3, 1902. Serial No. 105,776. (No model.)

*To all whom it may concern:*

Be it known that I, HIRAM W. BLAISDELL, a citizen of the United States, residing at Yuma, in the county of Yuma and Territory of Arizona, have invented new and useful Improvements in Apparatus for Cleaning Sand Filter-Beds, (Case A,) of which the following is a specification.

This invention relates to an improved apparatus for cleansing the sand composing the bed of filters used in purifying the supply of water to cities and towns. These filters are of various kinds, but are usually laid out in a series of beds made of sand and inclosed by walls running longitudinally and transversely thereof. The water is introduced into the basin formed by the said walls and filters and passes through the sand forming the filter-bed, thus leaving upon the surface of the sand the impurities previously contained in the water-supply. These impurities in time form a film or crust upon the upper surface of the sand, and the sand near the upper surface becomes covered with impurities, which interferes with the efficiency of the filter-bed, and it becomes necessary to remove this film or crust and to cleanse the sand upon the surface of the bed. As these filter-beds are of large area, to do this work of cleansing without the aid of machinery or mechanical apparatus involves an enormous amount of labor and expense; and it is the object of this invention to provide an apparatus which will thoroughly remove the film or matter from the bed and also cleanse the sand from the impurities hereinbefore set forth.

It is the further object of this invention to provide a strong, simple, and durable machine for the purpose hereinbefore set forth and to provide a machine which shall be adapted to follow the inequalities of the surface of the filter-bed and to remove the impurities therefrom without removing the sand.

The invention consists, in an apparatus for cleaning sand filter-beds, of a mixing-chamber, a rotary rake surrounded by said mixing-chamber, said rake provided with hollow teeth arranged to project downwardly and provided with outlets to discharge water below the surface of said filter-beds, and means for carrying said mixing-chamber over the surface of said filter-beds.

The invention again consists in the instrumentalities hereinbefore set forth in combination with a suction-pipe connected to said mixing-chamber to withdraw the impurities from said mixing-chamber which are dislodged by the streams of water from said rotary rake.

The invention still further consists in the instrumentalities hereinbefore set forth in combination with means guided by the upper surface of said filter-beds which determine the relative location of said mixing-chamber and rake to the surface of said beds.

The invention still further consists in the combination and arrangement of parts set forth in the following specification and particularly pointed out in the claims thereof.

Figure 2:
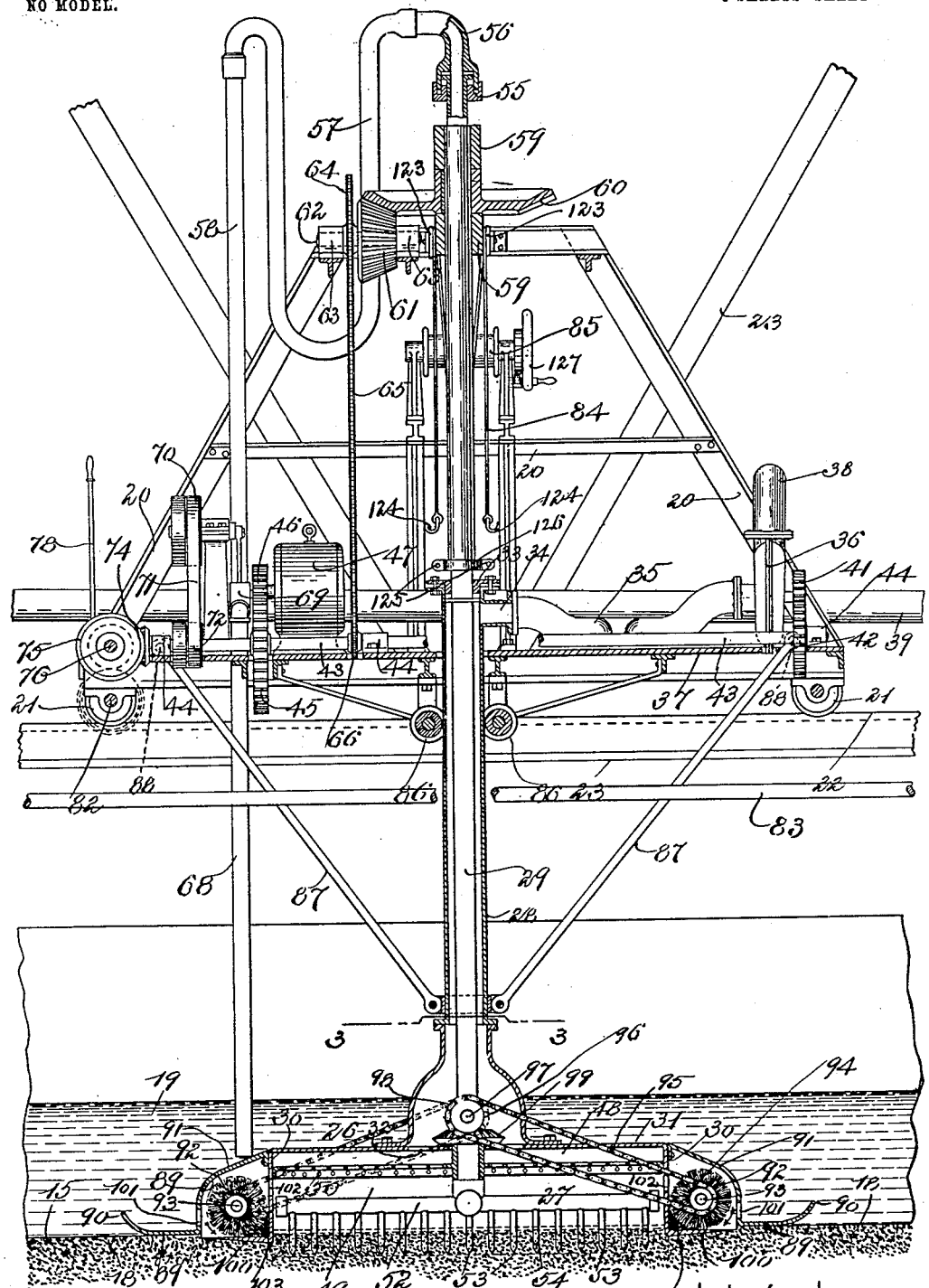
Figure 3:
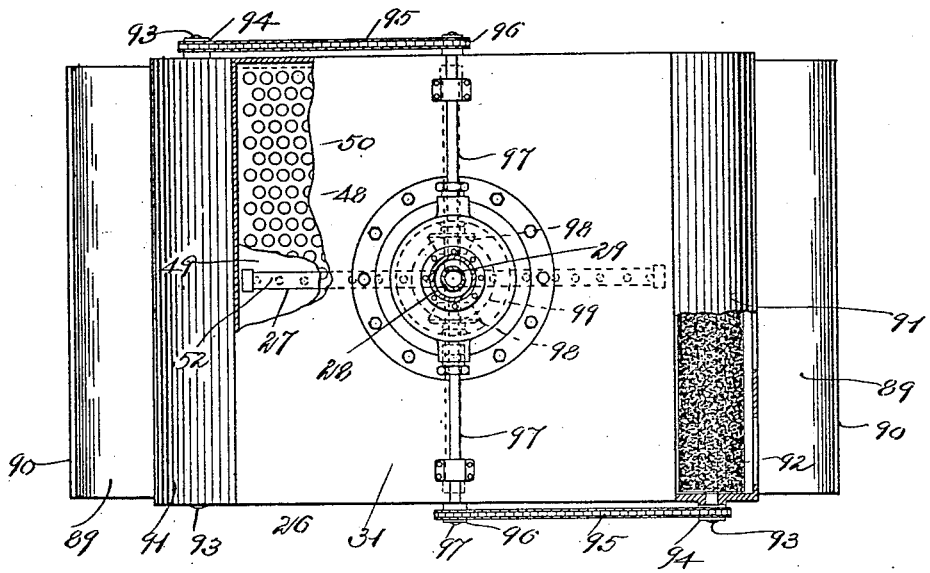
Figure 4:
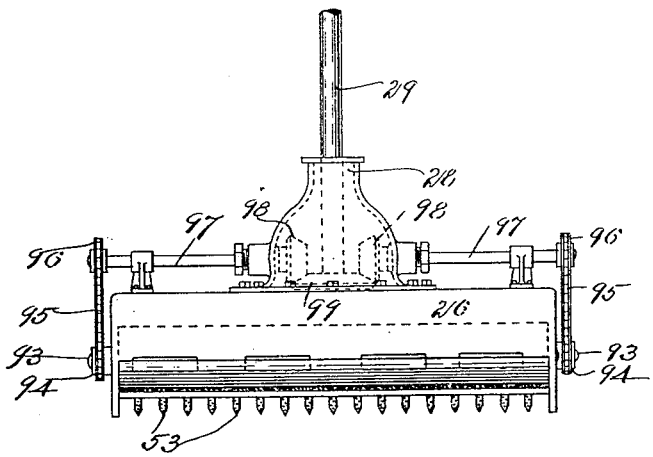
Figure 5:
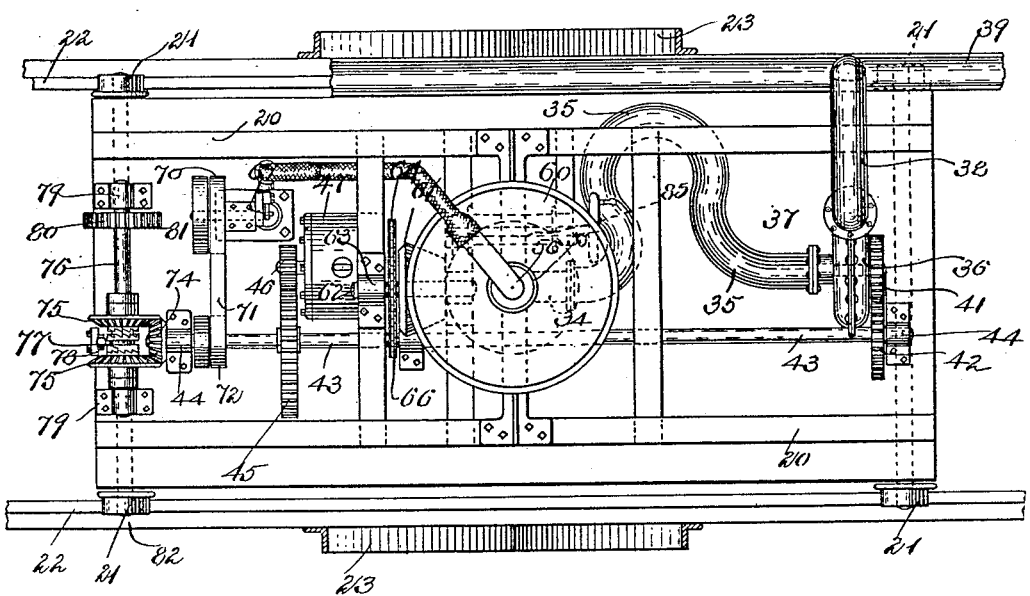
Figure 6:
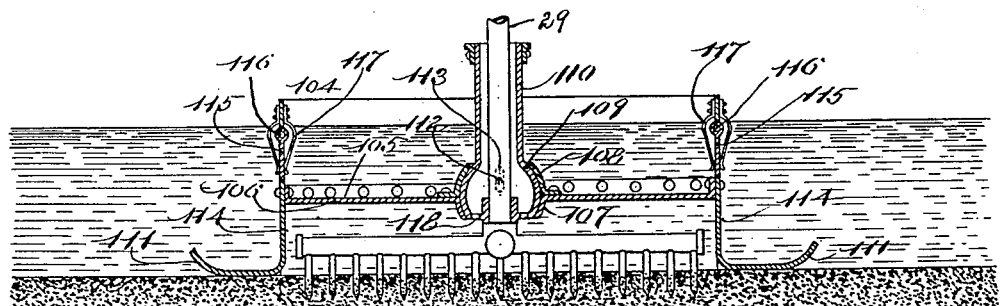
Figure 7:
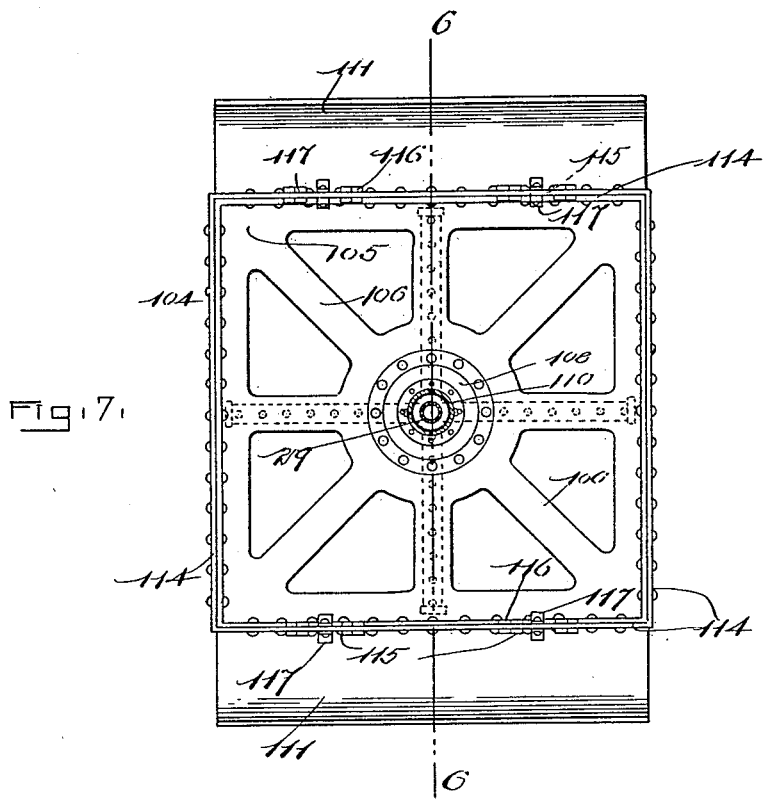
Figure 8:
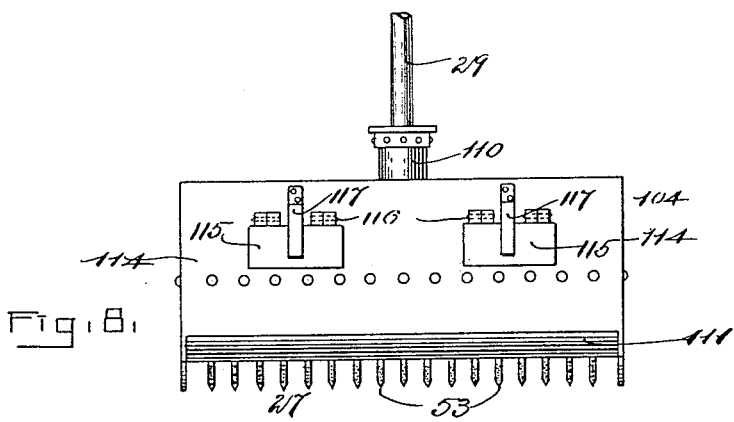

Referring to the drawings, Figure 1 is a transverse section taken through a sand filter-bed, showing my improved apparatus in front elevation and operatively located in connection therewith. Fig. 2 is a vertical longitudinal section, partly in elevation, of my improved apparatus, showing the main carriage broken away to save space in the drawings. Fig. 3 is a horizontal sectional plan taken on line 3 3 of Fig. 2, showing the top of the mixing-chamber broken away and in section. Fig. 4 is a side elevation taken from the right-hand side of Fig. 3. Fig. 5 is a plan view of the upper portion of the apparatus shown in Fig. 2. Fig. 6 is a central vertical section of a modified form of mixing-chamber, taken on line 6 6 of Fig. 7. Fig. 7 is a plan view of the form of mixing-chamber illustrated in Fig. 6. Fig. 8 is an end elevation of the same. Figs. 9, 10, and 11 illustrate a modified form of rake consisting of water-jets, and Figs. 12 and 13 show a modified form of the construction as applied to water-jets. Fig. 14 is a central section of another form of mixing-chamber.

Like numerals refer to like parts throughout the several views of the drawings.

In the drawings, 15 represents a sand filter-bed in transverse section, in which 16 17 are the side walls, 18 the sand composing the surface of the filter-bed, and 19 the water which is to be purified by filtration. The apparatus is directly supported upon a supplementary carriage 20, said carriage 20 being provided with wheels 21, which run upon tracks 22, provided upon the main carriage 23. The main carriage 23 is provided with wheels 24, which run upon tracks 25 25, provided upon the upper surface of the walls 16 17. It will be seen that the main carriage 23 moves lengthwise of the filter-bed upon the tracks 25, provided upon the walls 16 17, and that the supplementary carriage, upon which my improved mechanism is directly supported, moves crosswise of the filter-bed upon the tracks 22, which extend lengthwise of the main carriage 23, but transversely of the filter-bed, and thus it will be seen that my improved apparatus may be moved lengthwise and transversely of the filter-bed, as desired.

It is essential in apparatus of the character described that the cleansing device should be moved over the whole surface of the bed, that it should be capable of following the undulating surface of said bed without changing materially the relation of the working parts thereof, and that it should be capable of being raised and lowered bodily, and, further, that the sand should not be removed from the bed, but that a certain area of the sand should be inclosed while being operated upon, and that the inclosed area be agitated and cleansed by means of streams or jets of pure liquid, and finally the impurities be removed from the inclosed area, leaving the sand thoroughly cleansed. It is very essential that in the use of a suction-pipe the same should be so attached as to remove said impurities without sucking up the surface of the sand and making inequalities in the surface of the filter-bed. To attain these results, I provide, primarily, a mixing-chamber 26, which is provided with means whereby it may be raised and lowered upon the supplementary carriage 20 and also guided to preserve the same general relation to the surface of the sand filter-bed. In the interior of this mixing-chamber I provide a rake 27, either stationary or rotary, and above the rake is provided a suction-pipe 28, which removes the impure water from said mixing-chamber, the water by which the cleansing of the sand is performed being introduced through another pipe 29. The mixing-chamber 26 may be closed at the top, as shown in Fig. 2, or it may be open, as shown in the modified form illustrated in Figs. 6, 7, and 8, without departing from the spirit of my invention. The mixing-chamber 26 is preferably rectangular in shape, having four vertical walls 30, inclosing a certain area of the surface 18 of the sand bed, and has in the form shown in Fig. 2 a top 31 extending thereacross, with an opening 32 therein. A suction-pipe 28 is rigidly fastened to the top 31 and incloses the opening 32. Said suction-pipe extends vertically upward, Fig. 2, and has the upper end thereof closed by a stuffing-box 33. Near the top of the suction-pipe 28 an outlet-elbow 34 is provided, which is connected by a flexible pipe 35 to a centrifugal pump 36.

The centrifugal pump 36 is rigidly attached to the platform 37 of the supplementary carriage 20 and is provided with an outlet-pipe 38, arranged to discharge into a trough 39, extending lengthwise of the main carriage 23 transversely of the filter-bed, said trough being fast to said main carriage 23 and discharging into a channel or trough 40, provided in the upper face of the wall 16, said channel conveying the water, together with the impurities contained therein, to a sewer-pipe. The centrifugal pump has a gear 41, fast to the driving-shaft thereof, which meshes into a gear 42, fast to the main driving-shaft 43, extending lengthwise of the carriage 20 and arranged to rotate in bearings 44, fast to said carriage. The main driving-shaft 43 has a gear 45 fast thereto, which meshes into a pinion 46, driven by an electric motor 47, said electric motor being supported upon the platform 37.

The mixing-chamber 26 is preferably divided into two compartments 48 49 by a horizontal perforated partition 50. In the lower compartment 49 is provided a rake 27, which may be rigidly fast to the mixing-chamber 26, but is preferably arranged to rotate as shown in Fig. 2. Said rake consists of arms 52, formed of pipe and having hollow teeth 53 fast thereto and projecting downwardly therefrom, said hollow teeth being provided with discharge-outlets 54. The rake 27 is connected by the vertical water-pipe 29, which passes centrally through the suction-pipe 28 to the top of the apparatus, where it is connected by a swivel-joint 55 and elbow 56 to a flexible pipe 57, said flexible pipe being connected at the other end thereof to a vertical supply-pipe 58, which, as shown in the drawings, Fig. 2, takes water from the surface of the filter-bed 15 through a pipe 68 and pump 69. The pump 69 may be of any desirable construction and, as shown in the drawings, is driven by a pulley 70 and connected by a belt 71 to a pulley 72, fast to the main driving-shaft 43. Said supply-pipe 58 may, however, receive its supply from other sources, if desirable.

The pipe 29 turns in bearings 59 59, fast to the framework of the carriage 20, and in bearings provided in the stuffing-box 33 and in the suction-pipe 28. Said water-pipe is rigidly fastened to the rake 27 and is splined so as to be capable of sliding vertically therein to a bevel-gear 60. Said bevel-gear meshes into a bevel-gear 61, fast to a horizontal shaft 62, which rotates in bearings 63 upon the frame 20. The shaft 62 has a sprocket-gear 64 fast thereto and driven by a sprocket-chain 65 and sprocket-pinion 66, said sprocket-pinion being fast to the main driving-shaft 43.

The teeth of the rake 27 preferably project below the surface of the sand 18, so that the water which is forced out through the discharge-outlets 54 in the hollow teeth 53 passes upwardly through the sand and washes the impurities therefrom into the lower compartment 49 of the cleansing device 26. Said sand is at the same time thoroughly stirred by the rotary motion of the rake in combination with the transverse and longitudinal motion imparted to the said rake by the carriages 20 and 23, respectively, so that the film incrusting the sand and the impurities from the upper surface of the sand are thoroughly stirred up and mixed in the lower compartment 49, the suction applied through the pipe 28 drawing these impurities and the water contained in the lower compartment into the upper compartment 48, the partition 50 being provided for the purpose of separating the sand which enters the interior of said mixing-chamber from the water and the impurities therein which pass up through said perforated partition being drawn upwardly into the upper compartment 49 by the centrifugal suction-pump 36.

The mixing-chamber 26, together with the rake 27 and suction-pipe 28, are driven lengthwise of the carriage 23 upon the supplementary carriage 20 by a bevel-gear 74, fast to the main driving-shaft 43 and meshing into bevel-gears 75 75. The bevel-gears 75 75 are alternately locked to and disengaged from the shaft 76 by a clutch 77, operated by means of a lever 78. The shaft 76 rotates in bearings 79, supported upon the supplementary carriage 20, and has a gear 80 fast thereto, which meshes into a gear 81, fast to the shaft 82, extending transversely of the carriage 20 and having fast at each end thereof a wheel 21. The wheels 21, as hereinbefore set forth, rotate upon tracks 22, fast to the main carriage 23. The said mixing-chamber 26 and the parts attached thereto are moved lengthwise of the filter-bed by a motor 119, of any desirable construction, Fig. 1, supported upon the main carriage 23 and operatively connected by sprocket-gears 120 and 121 and a sprocket-chain 122 to a shaft 83, which in turn has a wheel 24 fast to each end thereof and running upon the tracks 25, as hereinbefore set forth.

The suction-pipe 28, together with the mixing-chamber 26 and rake 27 and pipe 29, are raised and lowered by means of a windlass 85 and wire ropes 84. Said wire ropes pass over pulleys 123 and are provided with hooks 124 at their lower ends, which are adapted to engage in holes provided in the ears 125 upon the collar 126, fast to the pipe 29. The windlass 85 is rotated by means of a hand-wheel 127. When the said parts are raised from the surface of the bed, the pipe 29 slides through the bearings 59 59 and through the bevel-gear 60, to which it is splined. The suction-pipe 28 is guided and braced by the friction-rolls 86 86 and braces 87, the friction-rolls 86 acting as friction-guides when the suction-pipe is raised and lowered, as hereinbefore set forth, and the braces 87 being disconnected from the platform 37, to which their upper ends are attached, by removing a pin 88 therefrom, when said suction-pipe and the mixing-chamber 26, together with the parts attached thereto, are to be raised by means of the windlass 85 and ropes 84. The pins 88 are removed from the braces 87, and the said parts are then raised to the desired height to pass into a second filter-bed. In this operation of raising said parts the friction-rolls 86 act both as a guide and as a brace for said suction-pipe.

The surface of the filter-beds is not necessarily perfectly level, and being somewhat undulating it is necessary in order that the teeth of the rake 27 should always project to the same depth below the surface of the sand and that said mixing-chamber, together with other parts hereinbefore described, should bear the same relative location to said surface that means should be provided to guide said mixing-chamber over the surface of the sand, and in Fig. 2 I have illustrated such means, consisting of guiding-plates 89, fastened to opposite end walls of said mixing-chamber. Said guide-plates are curved upwardly at the outer ends 90 in order to slide easily over any obstructions or inequalities which they may encounter in being moved transversely across the filter-beds. The guide-plates 89 are formed to provide covers 91, which inclose at each end of the mixing-chamber a rotary brush 92, fast to a shaft 93, which turns in bearings formed upon the mixing-chamber and has fast to the outer end thereof a sprocket-gear 94, driven by a sprocket-chain 95 and sprocket-gear 96, said sprocket-gear 96 being fastened to a shaft 97, which turns in bearings upon the top of the mixing-chamber and has fastened thereto a bevel-gear 98, said bevel-gear 98 meshing into another bevel-gear 99, fast to the vertical water-pipe 29. Immediately beneath each of the rotary brushes 92 is a scraper or knife 100, which is rigidly fastened to the walls of the mixing-chamber and serves to skim the upper crust from the surface of the filter-bed. Said crust is broken up and mixed with water entering from the surface of the filter-bed through an opening 101 in the guide-plate 89 and is carried by the rotation of the rotary brush 92 in the direction of the arrow, Fig. 2, into the lower compartment 49 of the mixing-chamber through an opening 102. In order to more thoroughly break up the said film or crust and to at the same time cleanse the rotary brush 92, I provide a stationary brush 103, located directly above the rear end of the scraper 100 and so arranged that the bristles or wires of which it is composed project among the bristles or wires of which the rotary brush 92 is composed, and thus any portions of the crust carried by the rotary brush, as hereinbefore set forth, in the direction of the arrow, Fig. 2, will be broken up upon meeting the stationary brush 103 and thence carried through the opening 102 into the lower compartment of the cleansing device 26.

In Figs. 6, 7, and 8 I have illustrated a modified form of mixing-chamber 104. In this form of mixing-chamber the top is left open and a horizontal plate 105 is substituted for the perforated partition 50, hereinbefore described. The horizontal plate 105 is provided with arms 106 and has a centrally-depressed hollow spherical flange 107 integral therewith and a hollow spherical cap-flange 108 bolted thereto, said flanges forming together a socket-bearing for the spherical-shaped lower end 109 of the suction-pipe 110. The suction-pipe 110 is provided at its lower end with openings 118, through which water is drawn by a centrifugal suction-pump, as hereinbefore described. The water-pipe 29 and rake 27 are the same as in the form illustrated in Fig. 2. The mixing-chamber 104 is provided with guide-plates 111, and as the surface of the filter-bed varies these guides cause the mixing-chamber to tip upon the spherical end 109 of the suction-pipe 110, assuming different angles in accordance with the contour of said sand bed. The mixing-chamber 104 is prevented from rotating upon the suction-pipe 110 by pins 112 fast to each side of the spherical joint 109 and projecting into a slot 113, formed in the flange 108. This construction allows the mixing-chamber 104 to tip to a limited extent laterally as well as longitudinally.

In the walls 114 are provided valves 115, pivoted at 116 to said walls and provided at each side with springs 117. The object of the valves 116 is to keep the level of the water substantially the same inside the mixing-chamber 104 as the surface of the water in the filter-bed. If the suction-pipe 110 draws more water from the mixing-chamber 104 than is supplied through the pipe 29, then the valves 115 will open inwardly and said water from the surface of the filter-bed will flow inwardly through them to the interior of the mixing-chamber. If, on the contrary, the water-pipe 29 supplies more water than is removed from the mixing-chamber through the suction-pipe 110, then said valves will open outwardly and the water will flow from said mixing-chamber to mix with the water upon the surface of the filter-bed. Thus at all times the lower end of the suction-pipe 110 will be covered with water, serving the same purpose as if said mixing-chamber were provided with a cover.

The general operation of the apparatus hereinbefore specifically described is as follows: Assuming the mixing-chamber and the parts connected thereto to have been lowered to the surface of the filter-bed, as shown in Fig. 2, and to be located in one corner of said filter-bed, the lever 78 is thrown so as to cause the clutch 77 to engage one of the gears 75, thus rotating the shaft 76, and through the gears 80 and 81 rotating the shaft 82 and wheels 21, propelling the supplementary carriage transversely of the filter-bed. When the carriage has crossed said filter-bed, the clutch 77 is disengaged from the gear 75 by the lever 78 and the supplementary carriage 20 stops its motion transversely of the filter-bed. The main carriage 23 is now propelled lengthwise of said filter-bed by means of the electric motor 119, which rotates the shaft 83 and wheels 24, carrying said main carriage lengthwise of the filter-bed a distance equal to the width of the mixing-chamber 26. The electric motor is then stopped and the supplementary carriage 20 is propelled in the opposite direction to the movement hereinbefore described across the filter-bed by throwing the clutch 77 into the opposite gear 75 from that previously engaged. These lengthwise and transverse movements of the two carriages are repeated until the whole surface of the bed has been traversed by the mixing-chamber, and during these transverse and longitudinal movements of the mixing-chamber the rake 27 has been kept constantly in rotation by means of the sprocket-pinion 66, sprocket-chain 65, sprocket-gear 64, bevel-gear 61, bevel-gear 60, and rotary water-pipe 29, to which said rake is rigidly fastened. It will thus be seen that the rake 27 is moved transversely and lengthwise of the filter-bed and at the same time has a rotary motion in relation thereto. While the mixing-chamber and rake are thus being propelled over the surface of the filter-bed the centrifugal pump 36 is kept constantly in operation by means of the gears 41 and 42, and the water mixed with the impurities which have been stirred up by the rake 27, by the scraping-knives 100, and by the water issuing from the discharge-outlets 54, is drawn by the centrifugal suction-pump 36 through the suction-pipe 28 and discharges through the outlet-pipe 38 into the trough 39, thence flowing into the channel or trough 40 in the upper surface of the wall 16 of the filter-bed, and thence flowing to any desirable outlet, as to a sewer-pipe. The water is constantly supplied during the hereinbefore-described movement of the mixing-chamber and rake to the rake 27 by the rotary water-pipe 29 by means of the pump 69, which draws water through the pipe 68 from the surface water upon the filter-bed and forces it through the pipes 58 and 57 and the elbow 56 into and downwardly through said water-pipe 29. If desired, the water thus forced through the pipe 29 may be supplied from other sources than the surface water of the filter-bed.

Referring particularly to Figs. 9 to 11, inclusive, the reference character 130 designates an inclosing device or mixing-chamber, which may be of any preferred construction and size and is preferably provided with a guiding shoe or plate 89, substantially as before described. A suction-pipe 131 is preferably connected with said chamber at or near the top thereof to withdraw the impurities from the interior of the chamber, and any suitable apparatus may be connected with said pipe to effect such withdrawal essentially as hereinbefore explained. A pipe 132 preferably extends into the mixing-chamber 130 from any suitable source of supply of pure liquid, and the depending end 133 of said pipe is preferably provided with lateral extensions 134, desirably terminating in right-angle extensions 135, and the latter are preferably provided with a plurality of obliquely-extending perforated tubes or apertures 140, whereby the liquid may be directed obliquely against and into the surface inclosed by said mixing-chamber 130, thereby agitating such surface and washing the same in passing upwardly therethrough, whereupon the washing liquid and impurities can be withdrawn from the mixing-chamber through the suction-pipe 131, as before stated.

If found desirable, in practice an intermediate extension or pipe 136 may be employed, or a plurality thereof can be used, having obliquely-projecting perforated tubes, or apertures can be used instead of the tubes in order to effect a more thorough agitation and cleansing of the surface inclosed by the mixing-chamber 130.

In Figs. 12 and 13 of the drawings there is illustrated an inclosing device or mixing-chamber 130, with which communicates a suction-pipe 131 and a liquid-supply pipe 132, both having suitable connection, and the depending end 133 of the supply-pipe is preferably connected with a cross-pipe 137, communicating with a plurality of parallel branches or pipes 138, carrying downwardly-extending tubes 139, provided with perforations at or near the bottom thereof to direct jets or currents of liquid into the surface inclosed by the mixing-chamber, so as to rise through said surface and remove the impurities therefrom and to be withdrawn, together with such impurities, from the mixing-chamber through the suction-pipe 131, as will be readily understood.

In Figs. 9 to 13 the water-supply pipe and suction-pipe are both stationary, and it will be noted that the horizontal perforated partition is omitted, the same being unnecessary except in special instances.

In Fig. 14 is illustrated a modified form of my invention, in which a rotary water-supply pipe 141 imparts rotary motion to a rake 142, similar to the rake 27, the impurities and water being removed from the cleansing device 143 by a suction-pipe 144. The pipe 141 is journaled in a bearing 146, supported by bars 147 from the cleansing device 143. A horizontal partition 148 is provided, supported upon the bars 147 and fast to the walls of the cleansing device 143. Said partition is not perforated as in the form hereinbefore described, but is provided with a central cylindrical aperture 149, through which the muddy water is drawn by the suction-pipe 144.

While I have described my invention as provided with apparatus for moving the cleansing device longitudinally and transversely of the filter-beds, it is evident that a number of cleansing devices may be supplied located side by side, said number being sufficient to extend entirely across a filter-bed, and in such case it would only be necessary to supply mechanism to move said cleansing devices lengthwise of the filter-bed in order to cleanse the entire surface of said filter-bed.

It is not desired to limit or confine this invention to the specific construction, combination, and arrangement of parts herein shown and described, and the right is reserved to make all such changes in and modifications of the same which come within the scope of this gernic invention, the broad principle whereof is to provide mechanism to transport a cleansing device over the entire area of the surface to be cleansed, and to construct said device in such a manner as to inclose a certain portion of the surface to be cleansed, and to provide within said device means for agitating and cleansing a portion so inclosed, as well as providing for the introduction within said device of the cleansing liquid and the withdrawal therefrom of the impurities.

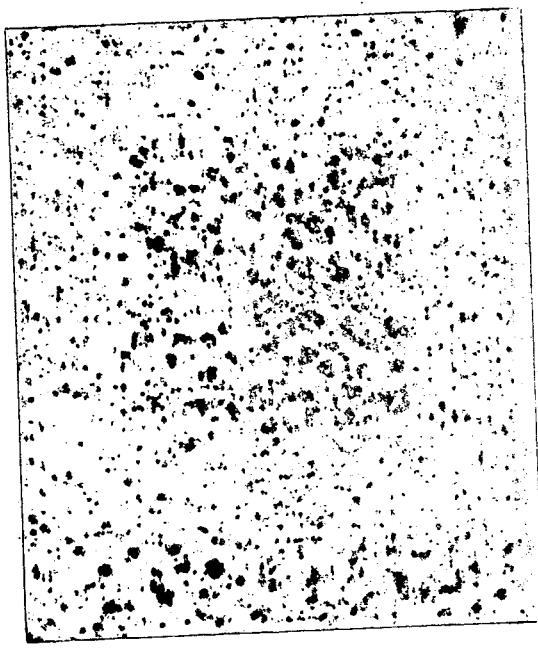

Having thus described my invention, what I claim, and desire by Letters Patent to secure, is—

1. In an apparatus for cleaning sand filter-beds, a mixing-chamber, a rotary rake surrounded by said mixing-chamber, said rake provided with hollow teeth arranged to project downwardly and provided with outlets to discharge water below the surface of said filter-beds, and means for carrying said mixing-chamber over the surface of said filter-beds.

2. In an apparatus for cleaning sand filter-beds, a rotary rake having hollow teeth provided with outlets arranged to discharge water below the surface of said sand beds, and means guided by said surface to determine the depth to which said teeth shall penetrate below said surface.

3. In an apparatus for cleaning sand filter-beds, a mixing-chamber, a rake surrounded by said mixing-chamber, said rake having hollow teeth provided with outlets arranged to discharge water below the surface of said sand beds, mechanism to rotate said rake, means for carrying said mixing-chamber over the surface of said filter-beds, and a suction-pipe connected to said mixing-chamber.

4. In an apparatus for cleaning sand filter-beds, a mixing-chamber, means for carrying said mixing-chamber over the surface of said filter-beds, a rotary rake surrounded by said mixing-chamber, said rake having hollow teeth provided with outlets arranged to discharge water below the surface of said sand beds, a suction-pipe connected to said mixing-chamber, and means guided by the upper surface of said filter-beds to determine the relative location of said mixing-chamber and rake to said surface.

5. In an apparatus for cleaning sand filter-beds, a mixing-chamber, a horizontal perforated partition dividing the interior of said mixing-chamber into an upper and a lower compartment, a suction-pipe connected to the upper compartment, and a rake located in the lower compartment.

6. In an apparatus for cleaning sand filter-beds, a mixing-chamber, a horizontal perforated partition dividing the interior of said mixing-chamber into an upper and a lower compartment, a suction-pipe connected to the upper compartment, a rake located in the lower compartment, and mechanism to rotate said rake.

7. In an apparatus for cleaning sand filter-beds, a mixing-chamber, a horizontal perforated partition dividing the interior of said mixing-chamber into an upper and a lower compartment, a suction-pipe connected to the upper compartment, a rake located in the lower compartment, and means for carrying said mixing-chamber over the surface of said filter-beds.

8. In an apparatus for cleaning sand filter-beds, a mixing-chamber, a horizontal perforated partition dividing the interior of said mixing-chamber into an upper and a lower compartment, a suction-pipe connected to the upper compartment, a rake located in the lower compartment, mechanism to rotate said rake, and means for carrying said mixing-chamber over the surface of said filter-beds.

9. In an apparatus of the character described, a mixing-chamber, and a valve provided in the wall thereof to supply water from the surface of said filter-bed to the interior of said mixing-chamber.

10. In an apparatus of the character described, a mixing-chamber, a scraper fast to the exterior of said mixing-chamber, and means guided by the upper surface of said filter-beds to determine the relative location of said scraper to said surface.

11. In an apparatus of the character described, a mixing-chamber, a scraper fast to the exterior of said mixing-chamber, and mechanism to move said mixing-chamber over the surface of said filter-beds.

12. In an apparatus of the character described, a mixing-chamber, a scraper fast to the exterior of said mixing-chamber, mechanism to move said mixing-chamber over the surface of said filter-beds, and mechanism to transfer the material removed by said scraper to the interior of said mixing-chamber.

13. In an apparatus for cleaning sand filter-beds, a mixing-chamber, a scraper fast to the exterior of said mixing-chamber, mechanism to move said mixing-chamber over the surface of said filter-beds, and a rotary brush arranged to transfer the material removed from the surface of said sand filter-beds by said scraper to the interior of said mixing-chamber.

14. In an apparatus for cleaning sand filter-beds, a mixing-chamber, a rake in said mixing-chamber, a rotary pipe fast to said rake and connected to a water-supply, and a suction-pipe inclosing said rotary pipe.

15. In an apparatus for cleaning sand filter-beds, a main carriage arranged to travel lengthwise of said beds, a supplementary carriage arranged to travel transversely of said filter-beds upon said main carriage, a mixing-chamber supported upon said supplementary carriage, and means for raising and lowering said mixing-chamber.

16. In an apparatus for cleaning sand filter-beds, a carriage arranged to travel over the surface of said beds, a suction-pipe supported upon said carriage, a mixing-chamber fast to said suction-pipe, a water-supply pipe located within said suction-pipe, and mechanism to rotate said water-supply pipe.

17. In an apparatus for cleaning sand filter-beds, a carriage arranged to travel over the surface of said beds, a suction-pipe supported upon said carriage, a mixing-chamber fast to said suction-pipe, a water-supply pipe located within said suction-pipe, mechanism to rotate said water-supply pipe, and means to raise and lower said suction and water-supply pipes.

18. In an apparatus for cleaning sand filter-beds, a carriage arranged to travel over the surface of said beds, a suction-pipe supported upon said carriage, a mixing-chamber fast to said suction-pipe, a water-supply pipe located within said suction-pipe, a rake inclosed within said mixing-chamber and fast to said water-supply pipe, and mechanism to rotate said water-supply pipe.

19. In an apparatus for cleaning sand filter-beds, a carriage arranged to travel over the surface of said beds, a suction-pipe supported upon said carriage, a mixing-chamber fast to said suction-pipe, a suction-pump located upon said carriage and operatively connected to said suction-pipe, a water-supply pipe located within said suction-pipe, a rake inclosed within said mixing-chamber and fast to said water-supply pipe, and a pump located upon said carriage and operatively connected to said water-supply pipe, substantially as described for the purpose specified.

20. In an apparatus of the character described, a mixing-chamber adapted to inclose a portion of a surface to be cleansed, mechanism to move said mixing-chamber over the surface of said filter-beds, and brush journaled to rotate upon said mixing-chamber and transfer material removed from said surface to the interior of said mixing-chamber.

21. In an apparatus for cleaning sand filter-beds, a mixing-chamber adapted to inclose a portion of a surface to be cleansed, a scraper fast to the exterior of said mixing-chamber, mechanism to move said mixing-chamber over the surface of said filter-beds, a rotary brush arranged to transfer the material removed from the surface of said filter-beds to the interior of said mixing-chamber, and a stationary brush adjacent to said rotary brush and coacting therewith for the purpose specified.

22. In an apparatus for cleaning sand filter-beds, a mixing-chamber adapted to inclose a portion of a surface to be cleansed, a horizontal partition dividing the interior of said mixing-chamber into an upper and a lower compartment, said horizontal partition provided with a hole extending therethrough and forming a means of communication between said compartments, a suction-pipe connected to the upper compartment, a rake located in the lower compartment and means for carrying said mixing-chamber over the surface of said filter-beds.

In testimony whereof I have hereunto set my hand in presence of two subscribing witnesses.

HIRAM W. BLAISDELL.

Witnesses:
CHARLES S. GOODING,
ANNIE J. DAILEY.